US010986011B2

(12) United States Patent
Gibson et al.

(10) Patent No.: US 10,986,011 B2
(45) Date of Patent: Apr. 20, 2021

(54) UNOBTRUSIVE SUPPORT FOR THIRD-PARTY TRAFFIC MONITORING

(71) Applicant: Google LLC, Mountain View, CA (US)

(72) Inventors: Daniel Earle Gibson, Madison, WI (US); Simon Luigi Sabato, Saratoga, CA (US); Monica C. Wong-Chan, Redwood City, CA (US); Milo Martin, Madison, WI (US)

(73) Assignee: Google LLC, Mountain View, CA (US)

( * ) Notice: Subject to any disclaimer, the term of this patent is extended or adjusted under 35 U.S.C. 154(b) by 23 days.

(21) Appl. No.: 15/787,658

(22) Filed: Oct. 18, 2017

(65) Prior Publication Data

US 2019/0116108 A1  Apr. 18, 2019

(51) Int. Cl.
*H04L 12/26* (2006.01)
*G06F 11/30* (2006.01)
(Continued)

(52) U.S. Cl.
CPC .......... *H04L 43/12* (2013.01); *G06F 11/3006* (2013.01); *G06F 11/3037* (2013.01);
(Continued)

(58) Field of Classification Search
CPC .... G06F 9/54; G06F 11/3006; G06F 11/3037; G06F 11/3072; G06F 11/3409;
(Continued)

(56) References Cited

U.S. PATENT DOCUMENTS 6,349,394 B1 * 2/2002 Brock .................. G06F 11/302
709/249
2005/0144403 A1  6/2005 Jeddeloh
(Continued)

FOREIGN PATENT DOCUMENTS

EP  2492792 A1  8/2012

OTHER PUBLICATIONS

VMWare, Inc. VMWare Reference Guide: Memory Counters, 2009. Retrieved from URL: https://www.vmware.com/support/developer/vc-sdk/visdk400pubs/ReferenceGuide/memory_counters.html on Oct. 18, 2017.
International Search Report and Written Opinion dated Dec. 3, 2018 in International (PCT) Application No. PCT/US2018/048141.
International Preliminary Report on Patentability for International Application No. PCT/US2018/048141 dated Apr. 30, 2020. 10 pages.

*Primary Examiner* — Nicholas R Taylor
*Assistant Examiner* — Michael Li
(74) *Attorney, Agent, or Firm* — Lerner, David, Littenberg, Krumholz & Mentlik, LLP

(57) ABSTRACT

System utilization related to memory usage can be monitored by storing host memory usage information in the corresponding host physical memory. However, retrieving this information can be a high overhead operation because it involves engaging with the operating system of each host. Moreover, storing memory usage information in the host physical memories can pose a security risk if they also store privileged data. Network interfaces according to the present disclosure provide unobtrusive and secure support for monitoring of network and other system resources such as regions of memory within host physical memories. Implementations according to the present disclosure include a plurality of memory region counters stored on a network interface. Each memory region counter corresponds to one of the memory regions located in a physical memory of a host coupled to the network interface. Each of the counters includes a system utilization metric associated with its corresponding memory region.

33 Claims, 6 Drawing Sheets

(51) Int. Cl.
*G06F 11/34* (2006.01)
*H04L 29/08* (2006.01)
*G06F 9/54* (2006.01)

(52) U.S. Cl.
CPC .......... *G06F 11/3409* (2013.01); *H04L 43/04* (2013.01); *H04L 43/062* (2013.01); *H04L 43/0876* (2013.01); *G06F 9/54* (2013.01); *H04L 43/10* (2013.01); *H04L 67/2814* (2013.01)

(58) Field of Classification Search
CPC ......... G06F 21/41; H04L 43/04; H04L 43/08; H04L 43/10; H04L 43/12; H04L 43/062; H04L 43/0876; H04L 67/2814
See application file for complete search history.

(56) References Cited

U.S. PATENT DOCUMENTS

2006/0245369 A1* 11/2006 Schimmelpfeng ...... H04L 43/08
 370/252
2011/0154443 A1* 6/2011 Thakur .................. G06F 21/41
 726/3

* cited by examiner

US 10,986,011 B2

UNOBTRUSIVE SUPPORT FOR THIRD-PARTY TRAFFIC MONITORING

BACKGROUND

Distributed computing systems commonly suffer from a performance pathology known as hotspotting, in which a load imbalance affects specific nodes and not others. The affected nodes become "hot", which generally means that their individual utilizations are too high and their service times begin to suffer. In extreme cases, the affected nodes may fail entirely.

SUMMARY

According to one aspect, the subject matter described in this disclosure relates to a network interface. The network interface includes a plurality of host memory region counters. Each of the plurality of host memory region counters corresponds to one of a plurality of memory regions located in a physical memory of a host coupled to the network interface. Each of the plurality of host memory region counters includes a system utilization metric associated with its corresponding memory region. The network interface includes a traffic monitor. The traffic monitor updates the host memory region counters in response to receipt by the network interface of requests to access the respective host memory regions. The network interface includes a controller. The controller accesses the plurality of memory regions on the host computer coupled to the network interface. The controller receives a resource request message seeking system utilization data associated with a memory region identified in the resource request message. The controller generates a response to the resource request message based on information stored in the host memory region counter associated with the memory region identified in the resource request message.

In some implementations, the network interface also includes a global counter that includes a system utilization metric associated with the network interface and the traffic monitor updates the global counter in response to receipt by the network interface of requests to access the respective host memory regions, and updates the global counter in response to the controller receiving the resource request message.

In some implementations, the one or more memory regions of the plurality of memory regions are associated with a queue.

In some implementations, the generated response to the resource request message includes information about a head and a tail of the memory region identified in the resource request message.

In some implementations, the generated response to the resource request message includes information about at least one of a depth of the queue and a size of the queue.

In some implementations, the one or more memory regions of the plurality of memory regions are registered memory regions.

In some implementations, the one or more memory region access keys are stored on the network interface, each memory region access key corresponding to one of the plurality of registered memory regions.

In some implementations, the one or more registered memory regions each correspond to an application executing on the host computer coupled to the network interface.

In some implementations, the controller determines whether the source of the resource request message is authorized to seek system utilization data associated with the memory region identified in the resource request message. In response to determining that the source of the resource request message is not authorized to seek system utilization data associated with the memory region identified in the resource request message, the controller halts further processing of the resource request message. The traffic monitor updates the host memory region counters in response to the controller determining that the source of the resource request message is authorized to seek system utilization data associated with the memory region identified in the resource request message.

In some implementations, the source of the resource request message is a third-party entity that is separate and independent of the network interface and the host computer connected to the network interface.

In some implementations, the resource request message includes host memory access request information, and the controller determines the authority of the source of the resource request using the host memory access request information and the memory region access key corresponding to the identified registered memory region stored on the network interface.

According to another aspect, the subject matter described in this disclosure relates to a method that includes maintaining, on a network interface that can access a plurality of memory regions on a host computer coupled to the network interface, a plurality of host memory region counters. Each of the plurality of host memory region counters corresponds to one of the plurality of memory regions located in a physical memory of the host computer coupled to the network interface. Each of the plurality of host memory region counters includes a system utilization metric associated with its corresponding memory region. The method includes updating the host memory region counters in response to receipt by the network interface of requests to access the respective host memory regions. The method includes receiving a resource request message, at the network interface, seeking system utilization data associated with a memory region identified in the resource request message. The method includes generating a response to the received resource request message based on information stored in the host memory region counter associated with the memory region identified in the resource request message.

According to another aspect, the subject matter described in this disclosure relates to a non-transitory computer-readable medium on which instructions are stored, the instructions, when executed by one or more computing devices perform a method that includes maintaining, on a network interface that can access a plurality of memory regions on a host computer coupled to the network interface, a plurality of host memory region counters. Each of the plurality of host memory region counters corresponds to one of the plurality of memory regions located in a physical memory of the host computer coupled to the network interface. Each of the plurality of host memory region counters includes a system utilization metric associated with its corresponding memory region. The method includes updating the host memory region counters in response to receipt by the network interface of requests to access the respective host memory regions. The method includes receiving a resource request message, at the network interface, seeking system utilization data associated with a memory region identified in the resource request message. The method includes generating a response to the received resource request message based on information stored in the host memory region counter associated with the memory region identified in the resource request message.

BRIEF DESCRIPTION OF THE DRAWINGS

The foregoing will be apparent from the following more particular description of example implementations of the invention, as illustrated in the accompanying drawings. The drawings are not necessarily to scale, emphasis instead being placed upon illustrating implementations of the present invention.

For purposes of clarity, not every component may be labeled in every figure. The drawings are not intended to be drawn to scale. Like reference numbers and designations in the various figures indicate like elements.

DETAILED DESCRIPTION

Typical strategies for counteracting the phenomenon of hotspotting generally include rebalancing and up-replicating. The first step in reactive mitigation of hotspots however, is detection. Detecting hotspots requires visibility into the load levels within a distributed system which is generally achieved by means of self-reporting within the affected system. However, self-reporting is not always possible, for example, in the case of one-sided communications such as remote memory access (RMA). Self-reporting can also further increase the load on the affected system. Additionally, self-reporting is sometimes undesirable. For example, a service provider may not be willing to trust a service customer to accurately self-report. Compounding the problem, even local detection of a hotspot can be expensive, as the mechanisms used to monitor for over-utilization are often not well-optimized. This leads to a tendency to monitor system utilization at coarse time granularities (e.g., 1 second or longer between samples).

Figure 1A:
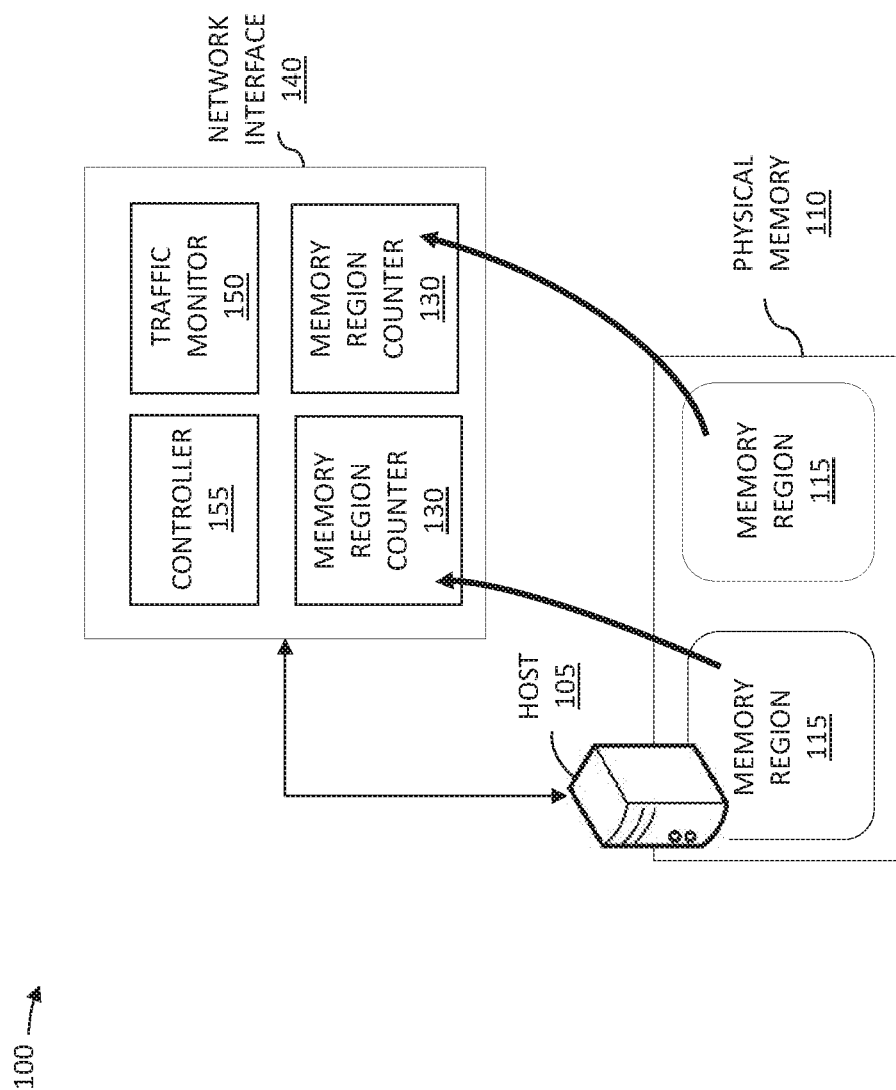
FIG. 1A is a diagram of a system, according to an example implementation.

Systems and methods according to the present disclosure provide unobtrusive support for monitoring of system or network resources. The monitored resources may be regions of memory within a host physical memory. In some implementations, the regions of memory can be associated with one or more queues. FIG. 1A is a diagram of a system 100, according to an example implementation. The system 100 includes a host computer 105 coupled to a network interface 140. In some implementations, the network interface 140 can be a network interface card (NIC) coupled to the host 105. In some implementations, a plurality of hosts 105, each lacking its own network interface card can be coupled to the network interface 140. In such implementations, the network interface 140 may function both as a network interface and a top-of-rack (ToR) switch for the plurality of hosts 105 coupled to the network interface 140.

The host 105 includes a physical memory 110. A plurality of memory regions 115 are located within the physical memory 110 of the host 105. In some implementations, one or more of the plurality of memory regions 115 can be associated with a queue. In such implementations, the depth of the queue can be determined based on the information about the head and tail of the queue. In some implementations, one or more memory regions 115 can be associated with a message queue that tracks a plurality of messages waiting to be processed. The depth of the message queue can indicate the back log of messages within the message queue. In some implementations, one or more of the plurality of memory regions 115 can each correspond to a region of memory that is associated with an application executing on the host 105. In some implementations, one or more of the plurality of memory regions 115 can be registered for RMA communication.

The network interface 140 includes a plurality of memory region counters 130, a traffic monitor 150 and a controller 155. Each of the plurality of memory region counters 130 corresponds to one of the plurality of memory regions 115 located within the physical memory 110 of the host 105 that is coupled to the network interface 140. Each of the plurality of memory region counters 130 includes a system utilization metric associated with its corresponding memory region 115. The traffic monitor 150 of the network interface 140 is configured to update the memory region counters 130 in response to receipt by the network interface 140 of requests to access the respective memory regions 115. The controller 155 of the network interface 140 is configured to receive a resource request message seeking system utilization data associated with one of the plurality of memory regions 115 identified in the received resource request message. The controller 155 of the network interface 140 is configured to generate a response to the received resource request message based on the information stored in the memory region counter 130 associated with the memory region 115 identified in the received resource request message.

In some implementations, an authenticated party can unobtrusively and securely monitor activity associated with a specific network resource such as a memory region 130. In some implementations, the controller 155 of the network interface 140 can be configured to determine whether the source of a resource request message received by the network interface 140 is authorized to seek the system utilization data associated with the memory region 115 identified in the resource request message. The controller 155 can be configured to halt further processing of the resource request message in response to determining that the source of the resource request message is not authorized. In some implementations, the source of the resource request message can be a third-party entity that is separate and independent of the host 105 and the network interface 140. In some implementations, one or more memory regions 115 located in the physical memory 110 of the host 105 are registered memory regions. In such implementations, the network interface 140 can store one or more memory region access keys each corresponding to one of the plurality of registered memory regions. In some implementations, the controller 155 of the network interface 140 can be configured to determine whether the source of the resource request message is authorized to seek system utilization data associated with a registered memory region identified in the resource request message. In such implementations, the resource request message can include host memory access request information, and the controller 155 can be configured to determine the authority of the source of the resource request using the host memory access request information and the memory region access key corresponding to the identified registered memory region stored on the network interface 140.

Storing the memory region counters 130 on the network interface 140 enables the system utilization metric associated with each memory region 115 to be monitored without engaging with the operating system of the host 105 thereby, providing unobtrusive low overhead monitoring of memory resources. Additionally, storing the memory region counters 130 on the network interface 140, isolates the contents of the memory region counters 130 from potentially privileged data that may reside within the physical memories 110 of the hosts 105 thereby, providing secure third-party monitoring of memory resources.

Figure 1B:
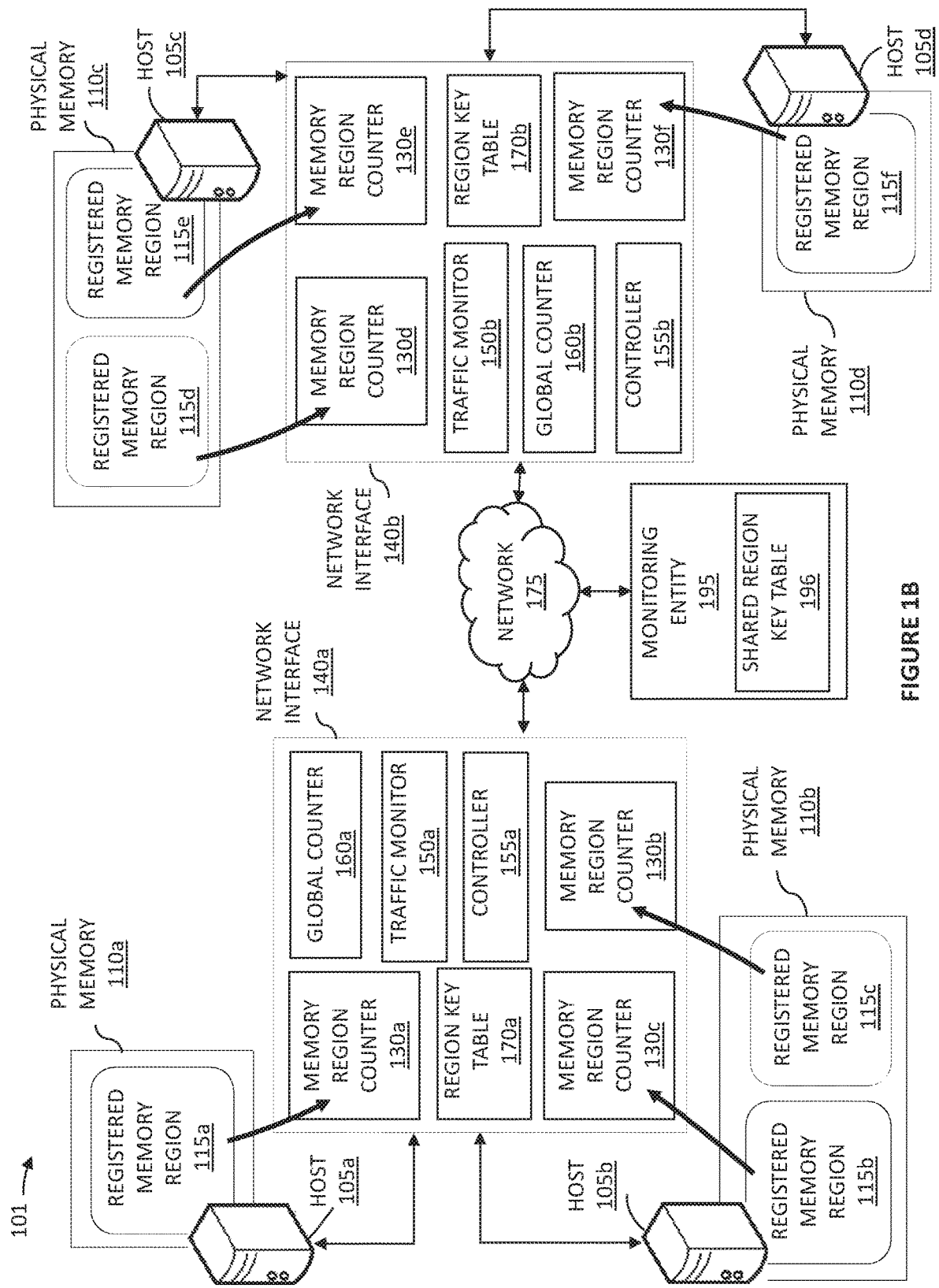
FIG. 1B is a diagram of an environment illustrating a system that provides unobtrusive third-party system utilization monitoring, according to an example implementation.

FIG. 1B is a diagram of an environment 101 illustrating a system that provides unobtrusive third-party system utilization monitoring, according to an example implementation. The environment 101 includes a first network interface 140a and a second network interface 140b (generally network interfaces 140) in communication over a network 175. In some implementations, the environment 101 can include a monitoring entity 195 in communication with the network interfaces 140 over the network 175. Each of the network interfaces 140 can be in direct communication with one or more hosts 105a, 105b, 105c, or 105d (generally hosts 105). For example, the first network interface 140a can directly communicate with the first host 105a and the second host 105b that can each be electrically connected to the first network interface 140a. The second network interface 140b can directly communicate with the third host 105c and the fourth host 105d that can each be electrically connected to the second network interface 140b.

Each of the hosts 105a-105d includes a respective physical memory 110a-110d (generally physical memories 110). For example, the first host 105a includes the first physical memory 110a, the second host 105b includes the second physical memory 110b, the third host 105c includes the third physical memory 110c, and the fourth host 105d includes the fourth physical memory 110d. Each of the hosts 105 can be a physical server or other computing system. In some implementations, the hosts 105 can be computing devices 910 similar to those shown in FIG. 5.

Each of the network interfaces 140 is a computing device that provides a point of connection between the hosts 105 and the network 175. The first and second network interface 140a and 140b each include a respective first and second traffic monitor 150a and 150b (generally traffic monitors 150), a first and second controller 155a and 115b, a first and second region key table 170a and 170b (generally region key tables 170), a first and second global counter 160a and 160b (generally global counters 160), and a plurality of memory region counters 130a-130f (generally memory region counters 130).

In some implementations, one or more regions of memory within the physical memories 110 of the hosts 105 are registered for RMA communication. For example, as shown in FIG. 1B, a region of memory with the physical memory 110a of the first host 105a is registered as a first registered memory region 115a. A first and a second memory region within the physical memory 110b of the second host 105b are registered respectively as a third and a fourth registered memory region 115b and 115c. A first and a second memory region within the physical memory 110c of the third host 105c are registered respectively as a fifth and a sixth registered memory region 115d and 115e. A region of memory within the physical memory 110d of the fourth host 105d is registered as a seventh registered memory region 115f.

In some implementations, one or more applications can execute on each of the hosts 105. Each application executing on a corresponding one of the hosts 105 can be associated with a region of memory. In such implementations, the entirety of the region of memory or a subset of the region of memory that is associated with an application executing on a corresponding one of the hosts 105 can be registered for RMA communication. In some implementations, each application executing on a host 105 is associated with a single registered memory region ("application-specific registered memory region").

Each of a plurality of region keys corresponds to one of the plurality of registered memory regions 115. When a region of memory within the physical memory 110 of a host 105 is registered by that host 105, a corresponding region key is generated for the registered memory region 115. The generated region keys corresponding to the registered memory regions 115 are a shared secret (i.e., they are not shared in plain text) with one or more remote hosts and can be communicated to one or more remote hosts out-of-band in encrypted form. In some implementations, the region keys are communicated with one or more third-parties such as the network monitoring entity 195.

Unlike typical host computers, the hosts 105 shown in FIG. 1B lack their own internal network interfaces. Instead, the environment 101 includes a plurality of network interfaces 140, that each couple to multiple hosts 105, and serve as the network interfaces for those hosts 105. In some implementations, each of the plurality of hosts 105 is electrically connected one of the network interfaces 140 by a serial computer expansion bus or other direct bus connection. Among other functions, each of the network interfaces 140 is configured to transmit and receive RMA (and other) communications, such as a RMA read request message and a RMA read request response message on behalf of the hosts 105 to which it connects. In addition, in some implementations, the network interfaces 140 may function as top-of-rack (ToR) switches for the plurality of hosts 105 connected to the network interfaces 140.

In support of its RMA functionality, the first network interface 140a is configured to access a plurality of registered memory regions 115a-115c in the first and second hosts 105a and 105b that are electrically connected to the first network interface 140a. The second network interface 140b is configured to access a plurality of registered memory regions 115d-115f in the third and fourth hosts 105c and 105d electrically connected to the second network interface 140b. The network interfaces 140 are configured to generate (upon direction from an application on a host 105 coupled to the network interface 140) and transmit RMA requests. The network interfaces 140 are configured to receive, evaluate, and respond to RMA requests by generating and transmitting RMA responses.

The first and second network interfaces 140a and 140b may themselves be connected to each other via an electrical connection, such as a serial computer expansion bus or an Ethernet connection, or via an optical link, such as a fiber optic link. In some implementations with larger numbers of network interfaces 140, some pairs of network interfaces 140 may be connected via electrical links, whereas other network interfaces 140 may be connected via optical links.

The first and second network interfaces 140a and 140b each store a respective first region key table 170a and a second region key table 170b (generally region key tables 170). One or more region keys are stored within each of the region tables 170. Each region key corresponds to one of the plurality of registered memory regions 115a-115f. The first region table 170 of the first network interface 140a stores a corresponding region key for the each of the registered memory regions 115a-115c of the first and second hosts 105a and 105b. The second region table 170b of the second network interface 140b stores a corresponding region key for each of the registered memory regions 115d-115f of the third and fourth hosts 105c and 105d.

The first and second network interfaces 140a and 140b each store a plurality of memory region counters 130. Each memory region counter 130 corresponds to one of the plurality of registered memory regions 115a-115f. The memory region counters 130 each include a system utilization metric associated with its corresponding registered memory region 115. As shown in FIG. 1B, the first network interface 140a stores a first, second and third memory region counter 130a, 130b and 130c. The memory region counter 130a corresponds to the registered memory region 150a located within the physical memory 110a of the first host 105a. The memory region counter 130b corresponds to the registered memory region 150b located within the physical memory 110b of the second host 105b. The memory region counter 130c corresponds to the registered memory region 150c located within the physical memory 110b of the second host 105b. Similarly, the memory region counters 130d-130f stored on the second network interface 140b each correspond to a respective one of the registered memory regions 115d-115f located within the physical memories 110b and 110c of the third and fourth hosts 105c and 150d that are connected to the second network interface 140b. In some implementations, the first and second network interfaces 140a and 140b each store a respective first and second global counter 160a and 160b. The first global counter 160a includes a system utilization metric associated with the first network interface 140a and the second global counter 160b includes a system utilization metric associated with the second network interface 140b.

In some implementations, the environment 100 can include a monitoring entity 195. In some implementations, the monitoring entity 195 can be an authorized third-party entity that is separate and independent of the network interfaces 140 and the host computers 105. The monitoring entity 195 can monitor the activity associated with one or more specific network resources within the system. In FIG. 1B, the monitored network resources are the registered memory regions 115.

In support of their monitoring functionality, each of the network interfaces 140 discussed above includes a corresponding traffic monitor 150, e.g. traffic monitors 150a and 150b. The traffic monitors 150 of the network interfaces 140 are configured to update the memory region counters 130 and the global counters 160 in response to receipt by the network interfaces 140 of RMA requests that access the respective registered memory regions 115. The traffic monitors 150 are configured to update the global counters 160 in response to receipt by the network interfaces 140 of a resource request seeking system utilization data associated with a registered memory region 115 identified in the resource request.

Also in support of their monitoring functionality, each of the network interfaces 140 discussed above includes a corresponding controller 155, e.g. controllers 155a and 155b. The controllers 150 of the network interfaces 140 are configured to receive a resource request seeking system utilization data associated with a memory region identified in the resource request message, and to generate a response to the received resource request based on information stored in the memory region counter 130 associated with the registered memory region 115 identified in the resource request. Each of these functions is described briefly below, and then in detail in with reference to FIG. 4.

The traffic monitors 150 of the network interfaces 140 are configured to update the global counters 160 and the memory region counters 130 in response to receipt by the network interfaces 140 of requests that access the respective registered memory regions 115. In response to the network interface 140 performing an operation on a registered memory region 115 within the physical memory 110 of a host 105 connected to a network interface 140, the traffic monitor 150 of the network interface 140 updates the value in the memory region counter 130 corresponding registered memory region 115 and the global counter 160. The traffic monitor 150 increments the value in the memory region counter 130 and the global counter 160 by a cost associated with performing the operation. The cost can be based on at least the operation's corresponding operation load. Each type of operation, such as a read request, a write request or a read resource request, performed by the network interface 140 can each have a corresponding operation load. The operation load is indicative of a cost associated with execution of the operation. The operation load can be based on the operation type. For example, a write operation may have a larger operation load than a read operation. Additionally, different operations having the same operation type can each have a different corresponding operation load. For example, the corresponding operation load of a read operation retrieving a larger amount of data can be larger than the corresponding operation load than of a read operation retrieving a smaller amount of data. Accordingly, in various implementations, the operation load can be a variable or constant value.

As mentioned above, when an operation, such as read request, is received and processed by a network interface 140, the traffic monitor 150 of that network interface 140 increments the global counter 160 and the memory region counter 130 stored on the network interface 140 by a value based on a corresponding operation load. In some implementations, the traffic monitor 150 can increment the value in the global counter 160 and the memory region counter 130 by a value calculated according to: A*(operation load)+B, where A is an operation load coefficient and B is a per-operation cost associated with executing an operation. In some implementations, the values of A and B can be set based on the performance characteristics specific to the hardware used within the system. For example, due to variations in the manufacturing process, the actual cost associated with executing an operation can end up being more or less expensive than anticipated. The operation load coefficient (A) can be used to adjust an operation's corresponding operation load according to the performance characteristics of the specific hardware. As previously discussed, the memory region counters 130 and the global counters 160 include system utilization metrics associated with the respective registered memory regions 115 and the network interfaces 140. Therefore, adjusting an operation's corresponding operation load according to the actual hardware performance enables more accurate calculation of the system utilization. In some implementations, the value of the operation load coefficient (A) can be proportional to a particular operation's size as measured in bytes. In some implementations, the value of the operation load coefficient (A) can be set to, for example and without limitation, 1, 2 or 4. In some implementations, the per-operation cost associated with executing an operation (B) can be set to any integer between 8 and 256, for example, 64. In some implementations, the operation load coefficient (A) can be set to zero. In a predominantly operation-bottlenecked system, setting the operation load coefficient (A) to zero enables the computed system utilization to reflect only the per-operation cost associated with executing an operation. In some implementations, the per-operation cost of executing an operation (B) can be set to zero. In a predominantly bandwidth-bottlenecked system, setting the per-operation cost associated with executing an operation (B) to zero enables the computed system utilization to be based on the operation load associated with executing the operations. Thus, the per-operation cost (B) can adjust the effective cost of very small or even sizeless operations. In some implementations, the values of A and B can be selected via firmware settings.

The traffic monitors 150 are also configured to update the global counters 160 in response to receipt by the network interfaces 140 of a resource request seeking system utilization data associated with a registered memory region 115 identified in the resource request. In response to a network interface 140 receiving a resource request, the traffic monitor 150 increments the value in the global counter 160 of the network interface 140 based at least on the corresponding operation load of a resource request. Additionally, the controller 150 of the network interface 140 is configured to generate a response to the received resource request based on information stored in the memory region counter 130 associated with the registered memory region 115 identified in the resource request. In some implementations, the controller 155 of the network interface 140 can be configured to generate a response to the received resource request message based on the information about a head and a tail of the memory region 115 identified in the resource request. In some implementations, the controller 155 of the network interface 140 can be configured to generate a response to the received resource request based on the information stored in the global counter 160 of the network interface 140.

As previously mentioned, the network interfaces 140 in FIG. 1B are configured to generate and transmit RMA (and other) requests. The network interfaces 140 are also configured to receive, evaluate, and respond to RMA requests by generating and transmitting RMA (and other) responses. In support of its RMA functionality, each network interface 140 is configured to access a plurality of registered memory regions 115 on the hosts 105 that are connected to the network interface 140. The RMA functionality of the network interfaces 140 in FIG. 1B is discussed below.

Figure 2:
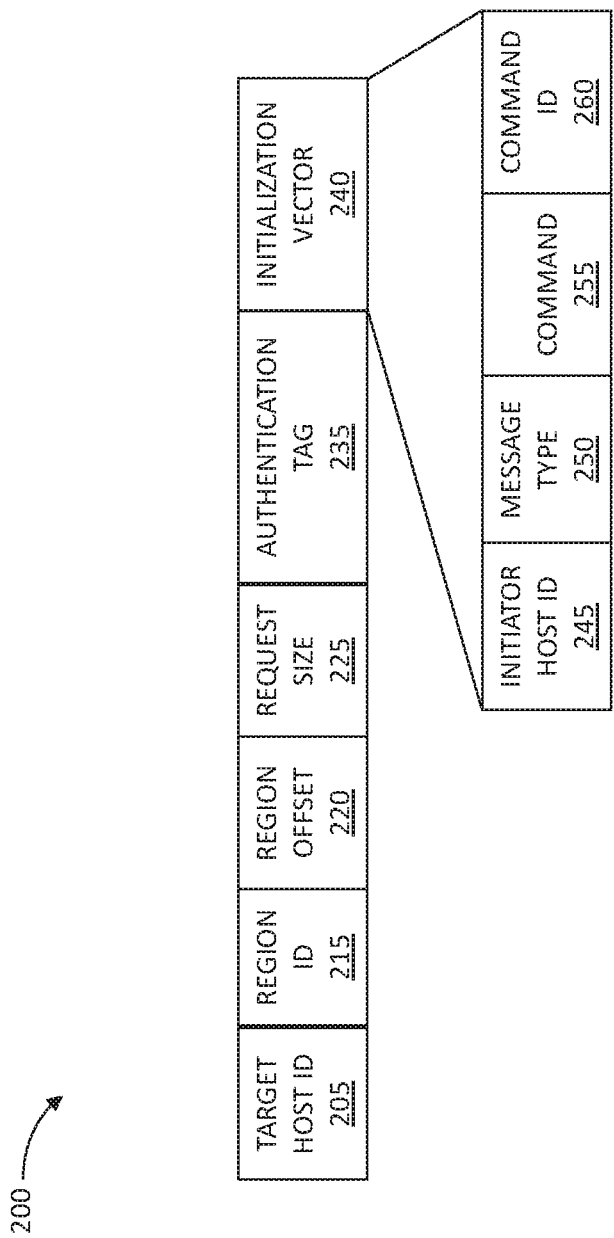
FIG. 2 is a diagram of a request generated and received by the network interfaces in FIG. 1B, according to an example implementation.

The network interfaces 140 are configured to receive a request (such as the example RMA request 200 shown in FIG. 2). A request received by a network interface 140 can be, for example and without limitation, a RMA read request or a resource request. In some implementations, a request received by a network interface 140 can originate from a different one of the network interfaces 140. In some implementations, a resource request received by a network interface 140 can originate from the monitoring entity 195. A RMA read request is a request for access to data located within an identified registered memory region 115. A RMA read request includes an identifier of one the plurality of registered memory regions 115, an identifier of a memory location within the identified registered memory region 115, and host memory access request information. A resource request seeks system utilization data associated with a registered memory region 115 identified in the resource request. A resource request includes an identifier of one the plurality of registered memory regions 115 and host memory access request information.

FIG. 2 is a diagram of a request 200 generated and received by the network interfaces 140 in FIG. 1B, according to an example implementation. The request 200 can be, for example and without limitation, a RMA read request or a read resource request. The request 200 can include a target host ID 205, a region ID 215, a region offset 220, a request size 225, and an authentication tag 235. The request 200 can also include an initialization vector 240 based on an initiator host ID 245, a message type 250, a command 255, and a command ID 260. In some implementations, the request 200 can include additional or fewer fields. The region ID 215 identifies one of a plurality of registered memory regions 115 that can be accessed by the network interface 140. The target host ID 205 identifies one of a plurality of hosts 105 that are electrically connected to the network interface 140. Therefore, the registered memory region 115 identified by the region ID 215 is located within the physical memory 110 of the host 105 identified by the target host ID 205 that is electrically connected to the network interface 140. The message type 250 identifies the type of the RMA request. As previously discussed, a request received by a network interface 140 can be, for example and without limitation, a RMA read request or a resource request. If the request is a RMA read request, the region offset 220 includes an offset relative to the memory location of the registered memory region identified by the region ID 215. The memory location of the requested data is determined based on the region offset 220 and the starting memory address of the registered memory region identified by the region ID 215. The size of the requested data is specified by the request size 225. If the request is a resource request, in some implementations, the values in the region offset 220 and the request size 225 fields are not relevant and therefore may not processed.

In some implementations, the network interfaces 140 are configured to store and track each request generated by the network interfaces 140. In some implementations, a request can be generated by a network interface 140 in response to a request initiated by a host 105 that is electrically connected to the same network interface 140. In some implementations, a RMA read request can be generated by a network interface 140 in response to a request initiated by a host 105 that is electrically connected to a different network interface 140. In some implementations, a request can be generated by the monitoring entity 195. As an example, a first network interface 140 can generate a RMA read request in response to a request initiated by an application executing on one of the hosts 105 that is electrically connected to the first network interface 140 (referred to as "initiator network interface"). The request can be for remote access to data within an identified registered memory region 115 corresponding to an application executing on a remote host 105 that is electrically connected to a second network interface 140 (referred to as "target network interface"). The initiator network interface 140 assigns a unique command ID the generated RMA read request. The initiator network interface 140 stores the information related to the generated RMA read request. In some implementations, the network interfaces 140 discussed above can each include a corresponding command table. The initiator network interface 140 can store information related to the generated RMA read request as an entry for the corresponding command ID assigned to the generated RMA read request within the command table of the initiator network interface.

The RMA request 200 can also include an initiator host ID 245, a command 225, and a command ID 260. The command 225 includes information related to the request 200. The command ID 260 includes the unique command ID assigned to the request 200 when it is generated. The initiator host ID 245 identifies the source of the request 200. If the request 200 is a RMA read request, the initiator host ID 245 identifies one of the hosts 105 that is not connected to the network interface 140 receiving the request 200. If the request 200 is a read resource request, the initiator host ID 245 can identify a monitoring entity 195 or a network interface 140.

In some implementations, the controllers 155 of the network interfaces 140 are configured to authenticate the source of a request that is received by the network interfaces 140. If the received request is a RMA read request, the controller 155 of the network interface 140 is configured to determine the authority of the source of the RMA read request to access data within the registered memory region 115 identified in the RMA read request. If the received request is a resource request, the network interface 140 is configured to determine the authority of the source of the resource request to seek system utilization data associated with the registered memory region 115 identified in the resource request. The authority of the source of the request is determined using the host memory access request information included in the request and the corresponding region key for the identified registered memory region that is stored within the region key table 170 of the network interface 140.

As discussed above, a request can include host memory access request information. Referring back to the example request 200 in FIG. 2, the initialization vector 240 can serve as the host memory access request information. The initialization vector (IV) 240 can be based on the initiator host ID 245, the message type 250, the command 225, and the command ID 260.

The network interfaces 140 are configured to update the memory region counters 130 and/or the global counters 160. If it is determined that the source of a received RMA read request is authorized, the traffic monitor 150 of the network interface 140 is configured to update the corresponding memory region counter 130 of the registered memory region 115 identified in the request and update the global counter 160. If it is determined that the source of a received resource request is authorized, the traffic monitor 150 of the network interface 140 is configured to update the global counter 160. However, if it is determined that the source of the request is not authorized, the network interface 140 is configured to halt further processing of the request. In some implementations, the network interface 140 can be further configured to generate an error response and transmit the generated error response to the source of the request.

In some implementations, the network interfaces 140 are configured to provide authenticating encryption. In some implementations, the source of the request can encrypt one or more portions of the request before transmitting it to the network interface 140. The source of the request can encrypt the one or more portions of the request using the corresponding shared region key for the identified memory region 115 and the host memory access request information included in the initialization vector 240 of the request as shown in FIG. 2. Encrypting the one or more portions of a request creates authentication data that is included in the request as the authentication tag 235. The initialization vector 240 is included in the request 200 in plain text (i.e., not encrypted) but the shared region key is not included in the request 200. Upon receipt of a request, the network interface 140 is configured to cryptographically process at least a portion of the received request using the region key stored in the region key table 170 and the initialization vector. The cryptographic processing results in decrypted data and authentication data. The authentication data is compared to the authentication tag 235 included in the request. If the two values match, the request is deem authorized and successfully authenticated. A similar authenticating encryption process can be used when creating the response.

Figure 3:
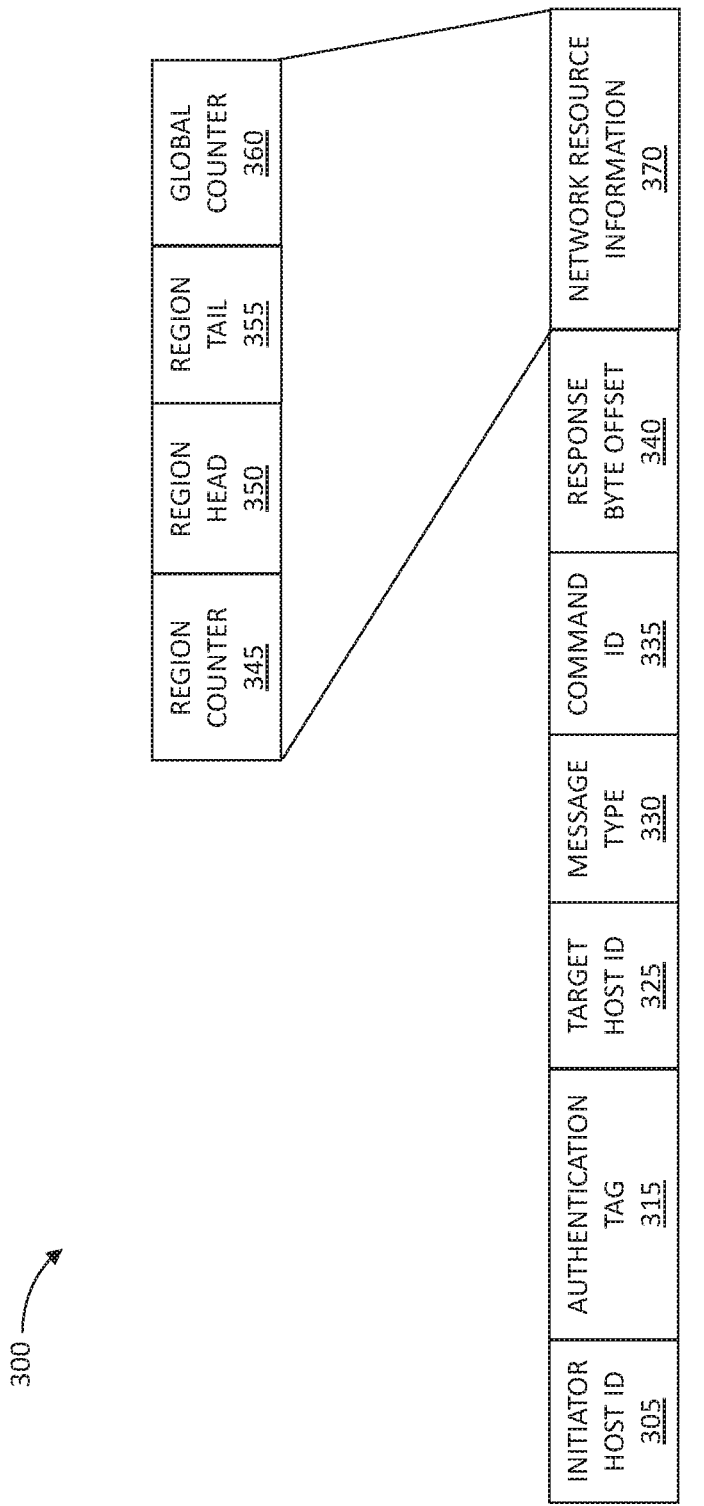
FIG. 3 is a diagram of a response generated and transmitted by the network interfaces in FIG. 1B, according to an example implementation.

The network interfaces 140 are configured to generate one or more responses to a corresponding request. The network interfaces 140 are configured to transmit the generated one or more responses to the source of the corresponding request. FIG. 3 is a diagram of a response generated by a network interface 140 in FIG. 1B, according to an example implementation. The response 300 can include an initiator host ID 305 and an authentication tag 315. The initiator host ID 305 identifies the authenticated source of the corresponding request. If the corresponding request is a RMA read request, the initiator host ID 305 identifies the host 105 that initiated the RMA read request. If the corresponding request is a read resource request, the initiator host ID 305 identifies the host 105 or the monitoring entity 195 that is requesting network resource information. The target host ID 325 identifies the host 105 that is associated with the registered memory region 115 identified in the corresponding request. The message type 330 identifies the type of the response. As previously discussed, the response 300 may be a RMA read response or a resource response. If the response is a RMA read response, the response byte offset 340 specifies an offset relative to the memory location of the requested data. The response byte offset 340 identifies the location of the portion of the data included in a RMA read response relative to the starting memory address of the requested data.

If the corresponding request is a resource request, the generated response 300 is a resource response and includes the resource information 370. As shown in FIG. 3, the resource information 370 can include a region counter 345, a region head 350, a region tail 355, and a global counter value 360. The region counter 345 can be based on information stored in the memory region counter 130 associated with the registered memory region 115 identified in the resource request. The global counter 360 can be based on information stored in the global counter 160 of the network interface 140. The region head 320 and the region tail 355 specify the start and end of a memory region. The region head 320 can include an offset relative to the starting address of the registered memory region identified in the corresponding resource request. The region tail 355 can include an offset relative to the starting address of the registered memory region identified in the corresponding resource request. In some implementations, the resource response can include a queue depth and a queue size.

As previously discussed, in some implementations, the network interfaces 140 are configured to provide authenticating encryption when creating and receiving a request. A similar authenticating encryption process can be used when creating and receiving a response. In some implementations, the network interface 140 can be configured to encrypt one or more portions of a response before transmitting it. The network interface 140 can encrypt the one or more portions of the response using the corresponding region key for the identified registered memory region and an initialization vector. Encrypting the one or more portions of a response creates authentication data that is included in the response as the authentication tag 315.

Upon receipt of the response, at least a portion of the received response can be decrypted using the shared region key corresponding to the registered memory region identified in the request and the initialization vector that was used for encrypting the response. The initialization vector in a response may not include all the information necessary to decrypt the contents of the response. In such implementations, a first portion of the initialization vector that was used for encrypting the response can be re-constructed by the receiver of the response based on the target host ID 325, the message type 330, the command ID 335 and the response byte offset 340 of the response. A second portion of the initialization vector that was used for encrypting the response can be re-constructed by the receiver of the response based on information stored by the receiving entity in a command table. If the entity receiving the response is a network interface 140, the region key used for the decryption can be retrieved from the region key table 170. If the receiving entity is a monitoring entity 195, the region key used for the decryption can be retrieved from the shared region key table 196 of the monitoring entity 196. The cryptographic processing results in decrypted data and authentication data. The authentication data is compared to the authentication tag 315 included in the response. If the two values match, the response is deemed authorized and authentic.

Figure 4:
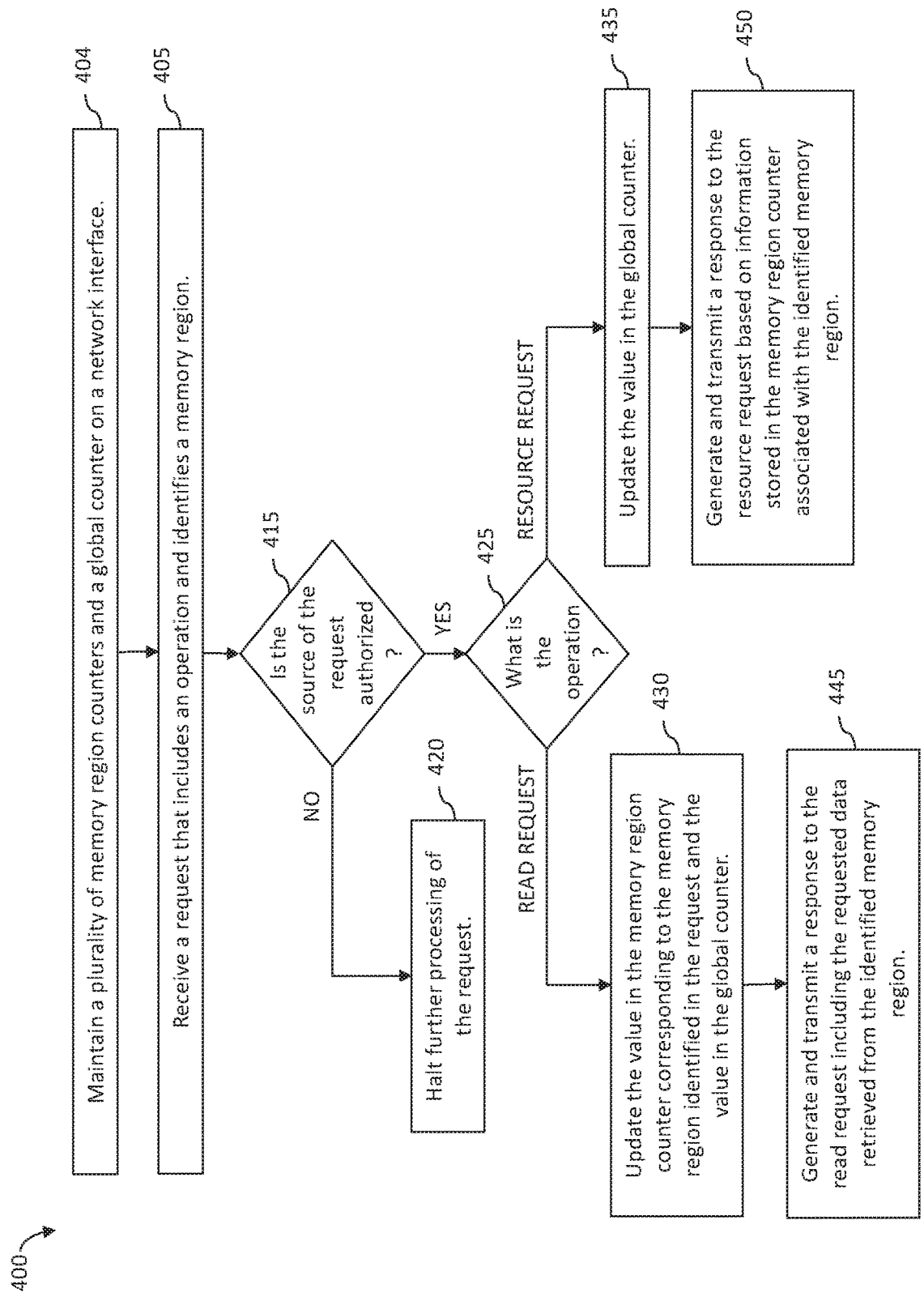
FIG. 4 is a flow diagram of a method for providing unobtrusive third-party system utilization monitoring, suitable for execution by the traffic monitors, the controllers and the network interfaces shown in FIG. 1B, according to an example implementation.

FIG. 4 is a flow diagram of a method 400 for providing unobtrusive third-party system utilization monitoring of network resources, suitable for execution by the network interfaces 140 in FIG. 1B, according to an example implementation. While method 400 is described with reference to FIG. 1B within the context of RMA communication, it should be noted that the method 400 can be performed by other implementations that support non-RMA communication. The method 400 includes maintaining a plurality of memory region counters and a global counter on a network interface (stage 404). The method 400 includes receiving a request that includes an operation and identifies a memory region (stage 405). The method 400 includes determining whether a source of the request is authorized to perform the operation (decision block 415). If it is determined that the source of the request is not authorized to perform the operation, the method 400 includes halting further processing of the request (stage 420). If it is determined that the source of the request is authorized to perform the operation, the method 400 includes determining the type of the operation (decision block 425). If it is determined that operation is a read request, the method 400 includes updating the value in the memory region counter corresponding to the memory region identified in the read request and updating the value in the global counter (stage 430) and transmitting a response to the read request (stage 445). If it is determined that operation is a resource request, the method 400 includes updating the value in the global counter (stage 435) and transmitting a response to the resource request (stage 450).

The method 400 includes maintaining a plurality of memory region counters and a global counter (stage 404). Referring back to the example implementation shown in FIG. 1B, the network interfaces 140 each include a plurality of memory region counters 130 and a global counter 160. The memory region counters 130 each include a system utilization metric associated with its corresponding registered memory region 115. The first global counter 160a includes a system utilization metric associated with the first network interface 140a and the second global counter 160b includes a system utilization metric associated with the second network interface 140b.

The method 400 includes receiving a request that includes an operation and identifies a memory region (stage 405). As previously discussed, the network interfaces 140 can be configured to receive a request (such as the example request 200 shown in FIG. 2). A request received by a network interface 140 can be, for example, a RMA read request or a resource request. In some implementations, a request can include other types of requests. A RMA read request is a request for access to data located within an identified registered memory region 115. A RMA read request includes an identifier of one the plurality of registered memory regions 115, an identifier of a memory location within the identified registered memory region 115, and host memory access request information. A resource request seeks system utilization data associated with a memory region identified in the request.

As previously discussed, in some implementations, the controllers 155 of the network interfaces 140 are configured to authenticate the source of a request that is received by the network interfaces 140. In such implementations, the method 400 includes determining whether a source of the request is authorized to perform the operation (decision block 415). If the received request is a RMA read request, the controller 155 of the network interface 140 is configured to determine the authority of the source of the read request to access data within the registered memory region 115 identified in the read request. If the received request is a resource request, the network interface 140 is configured to determine the authority of the source of the resource request to access system utilization data associated with a memory region identified in the request. The controller 155 can determine the authority of the source of the request using the host memory access request information included in the request and the corresponding region key for the identified registered memory region that is stored within the region key table 170.

As mentioned above, in some implementations, the controllers 155 of the network interfaces 140 are configured to authenticate the source of a RMA request that is received by the network interfaces 140. In such implementations, if it is determined that the source of the request is not authorized to perform the operation, the method 400 includes halting further processing of the request (stage 420). The controller 155 of the network interface 140 is configured to halt further processing of the request if the source of the request is not successfully authorized.

If it is determined that the source of the request is authorized to perform the operation, the method 400 includes determining the type of the request (decision block 425). Referring back to the example request format shown in FIG. 2, the type of the request can be determined based on the message type 250 of the received request.

If it is determined that received request is a read request, the method 400 includes updating the value in the memory region counter corresponding to the memory region identified in the read request and updating the value in the global counter (stage 430) and transmitting a response to the read request (stage 445). Referring back to FIG. 1B, if the request received at a network interface 140 is a RMA read request, the traffic monitor 150 of the network interface 140 updates the value in the memory region counter 130 corresponding to the registered memory region 115 identified in the RMA read request. The traffic monitor 150 of the network interface 140 also updates the value in the global counter 160. The controller 155 generates and transmits one or more RMA read responses including data retrieved from the memory location within the identified registered memory region 115.

If it is determined that the request is a resource request, the method 400 includes updating the value in the global counter (stage 435) and transmitting a response to the resource request (stage 450). Referring back to FIG. 1B, if the request received at a network interface 140 is a resource request, the traffic monitor 150 of the network interface 140 updates the value in the global counter 160. The controller 155 generates and transmits a resource response based on information stored in the memory region counter 130 associated with the registered memory region 115 identified in the received resource request. In some implementations, the generated resource response can, in addition or in the alternative, include the value of the global counter 160 and/or information related to the head and tail of the identified registered memory region 115.

Figure 5:
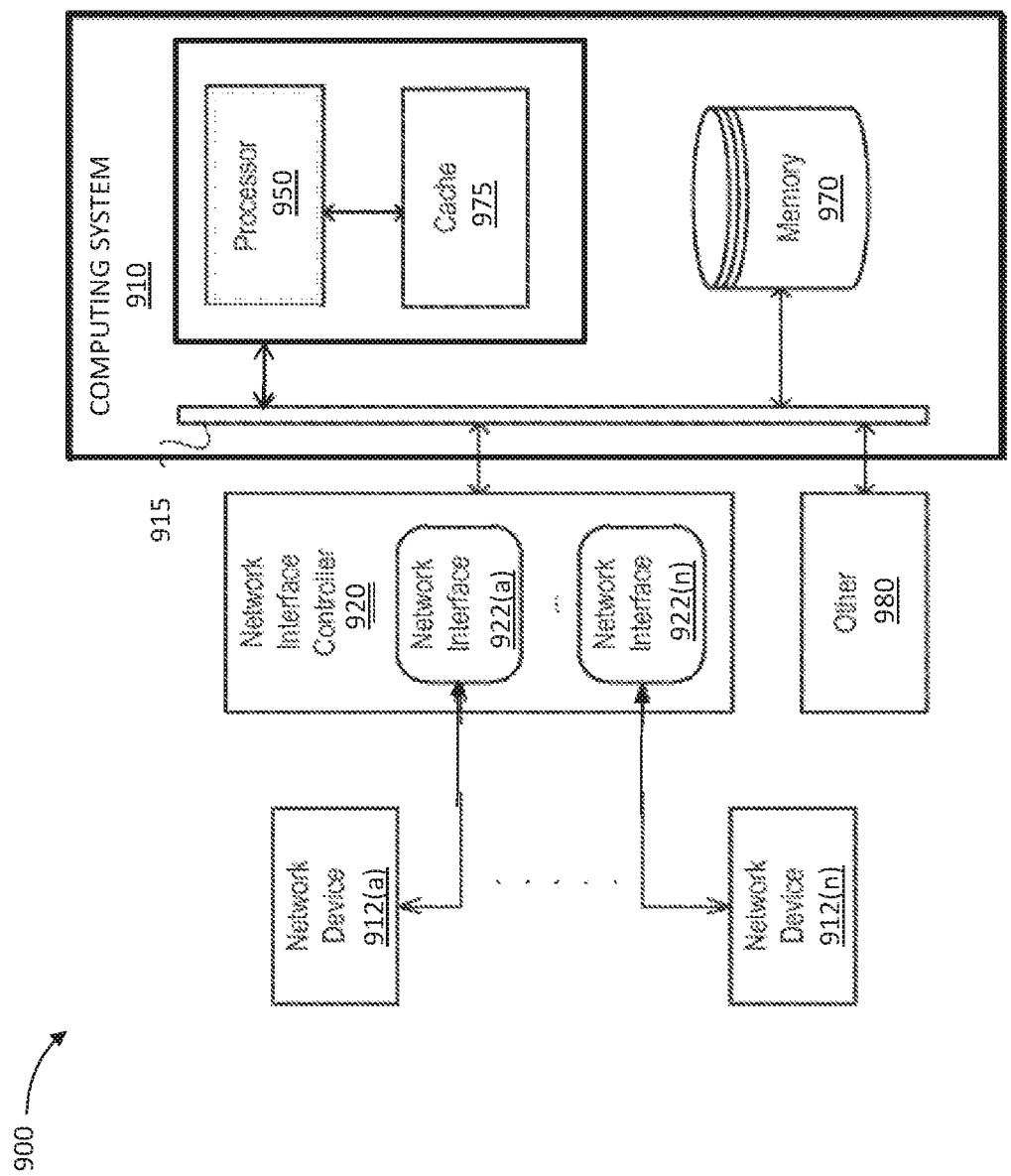
FIG. 5 is a diagram of a computing system suitable for use in the various implementations described.

FIG. 5 shows a block diagram of an example computing system 900. In some implementations, the computing system 900 may be utilized in implementing the hosts 105 shown in FIG. 1.

In broad overview, the computing system 910 includes at least one processor 950 for performing actions in accordance with instructions and one or more memory devices 970 or 975 for storing instructions and data. The illustrated example computing system 910 includes one or more processors 950 in communication, via a bus 915, with at least one network interface controller 920 with network interface ports 922(a-n) connecting to other computing devices 912(a-n), memory 970, and any other devices 980, e.g., an I/O interface. The network interface controller can be, for example, one of the network interfaces 140 shown in FIG. 1. Generally, a processor 950 will execute instructions received from memory. The processor 950 illustrated incorporates, or is directly connected to, cache memory 975.

Referring back to FIG. 1B, in some implementations, the hosts 150 connected over the network 175 may each execute one or more virtual machines or containers (collectively referred to herein as "virtualized computing instances" or VCIs), along with a hypervisor or container manager for managing the operation of the virtual machines or containers. Each VCI is allocated a region of memory within its corresponding host's physical memory. Within the host memory region that is allocated to a VCI, each application hosted by that VCI is allocated a region of memory.

In more detail, the processor 950 may be any logic circuitry that processes instructions, e.g., instructions fetched from the memory 970 or cache 975. In many embodiments, the processor 950 is a microprocessor unit or special purpose processor. The computing device 900 may be based on any processor, or set of processors, capable of operating as described herein. The processor 950 may be a single core or multi-core processor. The processor 950 may be multiple processors. In some implementations, the processor 950 can be configured to run multi-threaded operations. In some implementations, the processor 950 may host one or more VCIs, along with a hypervisor or container manager for managing the operation of the VCIs.

The memory 970 may be any device suitable for storing computer readable data. The memory 970 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and BluRay® discs). A computing system 900 may have any number of memory devices 970. In some implementations, the memory 970 supports virtualized or containerized memory accessible by VCI execution environments provided by the computing system 910.

The cache memory 975 is generally a form of computer memory placed in close proximity to the processor 950 for fast read times. In some implementations, the cache memory 975 is part of, or on the same chip as, the processor 950. In some implementations, there are multiple levels of cache 975, e.g., L2 and L3 cache layers.

The network interface controller 920 manages data exchanges via the network interfaces 922(a-n) (also referred to as network interface ports). The network interface controller 920 handles the physical and data link layers of the OSI model for network communication. The network interface ports 922(a-n) are connection points for physical network links. In some implementations, the network interface controller 920 supports wireless network connections and an interface port 922 is a wireless receiver/transmitter. Generally, a computing 910 exchanges data with other computing devices 912(a-n) via physical or wireless links to the network interfaces 922(a-n). In some implementations, the network interface controller 920 implements a network protocol such as Ethernet or other network protocol.

The other network devices 912(a-n) are connected to the computing system 910 via respective network interface ports 922. The other network devices 912(a-n) may be peer computing devices, network devices, or any other computing device with network functionality. In such implementations, the interface controller 920 can serve as a top of rack (ToR) switch for the computing devices 912(a-n).

The other devices 980 may include an I/O interface, other external serial device ports, and any additional co-processors. Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more VCIs that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A network interface, comprising:
   a plurality of host memory region counters, wherein each of the plurality of host memory region counters
   i) corresponds to one of a plurality of memory regions located in a physical memory of a host coupled to the network interface, and
   ii) includes a system utilization metric associated with its corresponding memory region;
   a traffic monitor configured to update the host memory region counters in response to receipt by the network interface of requests to access the respective host memory regions; and
   a controller configured to:
   access the plurality of memory regions on the host computer coupled to the network interface,
   receive a resource request message seeking system utilization data associated with a memory region identified in the resource request message,
   determine, using a cryptographic process on the received resource request message, whether the source of the resource request message is authorized to seek system utilization data associated with the memory region identified in the resource request message, the cryptographic process comprising decrypting a portion of the received resource request message to generate authentication data and comparing the authentication data to an authentication tag included in the received resource request message, and
   generate a response to the resource request message based on information stored in the host memory region counter associated with the memory region identified in the resource request message when the source of the resource request message is authorized.

2. The network interface of claim 1, wherein the network interface further comprises a global counter that includes a system utilization metric associated with the network interface and the traffic monitor is further configured to:
   update the global counter in response to receipt by the network interface of requests to access the respective host memory regions, and
   update the global counter in response to the controller receiving the resource request message.

3. The network interface of claim 1, wherein one or more memory regions of the plurality of memory regions are associated with a queue.

4. The network interface of claim 1, wherein the generated response to the resource request message includes information about a head and a tail of the memory region identified in the resource request message.

5. The network interface of claim 3, wherein the generated response to the resource request message includes information about at least one of a depth of the queue and a size of the queue.

6. The network interface of claim 1, wherein one or more memory regions of the plurality of memory regions are registered memory regions.

7. The network interface of claim 6, wherein one or more memory region access keys are stored on the network interface, each memory region access key corresponding to one of the plurality of registered memory regions.

8. The network interface of claim 6, wherein the one or more registered memory regions each correspond to an application executing on the host computer coupled to the network interface.

9. The network interface of claim 1, wherein:
   the traffic monitor is further configured to:
   update the host memory region counters in response to the controller determining that the source of the resource request message is authorized to seek system utilization data associated with the memory region identified in the resource request message.

10. The network interface of claim 9, wherein the source of the resource request message is a third-party entity that is separate and independent of the network interface and the host computer connected to the network interface.

11. The network interface of claim 9, wherein the resource request message includes host memory access request information, and the controller is further configured to:
   determine the authority of the source of the resource request using the host memory access request information and the memory region access key corresponding to the identified registered memory region stored on the network interface.

12. A method comprising:
   maintaining, on a network interface that can access a plurality of memory regions on a host computer coupled to the network interface, a plurality of host memory region counters, wherein each of the plurality of host memory region counters
   i) corresponds to one of the plurality of memory regions located in a physical memory of the host computer coupled to the network interface, and
   ii) includes a system utilization metric associated with its corresponding memory region;
   updating the host memory region counters in response to receipt by the network interface of requests to access the respective host memory regions;
   receiving a resource request message, at the network interface, seeking system utilization data associated with a memory region identified in the resource request message;
   determining, using a cryptographic process on the received resource request message, whether the source of the resource request message is authorized to seek system utilization data associated with the memory region identified in the resource request message, the cryptographic process comprising decrypting a portion of the received resource request message to generate authentication data and comparing the authentication data to an authentication tag included in the received resource request message; and
   generating a response to the received resource request message based on information stored in the host memory region counter associated with the memory region identified in the resource request message when the source of the resource request message is authorized.

13. The method of claim 12, wherein the network interface further comprises a global counter that includes a system utilization metric associated with the network interface and the method further comprises:
   updating the global counter in response to receipt by the network interface of requests to access the respective host memory regions; and
   updating the global counter in response to receiving the resource request message.

14. The method of claim 12, wherein one or more memory regions of the plurality of memory regions are associated with a queue.

15. The method of claim 12, wherein the generated response to the resource request message includes information about a head and a tail of the memory region identified in the resource request message.

16. The network interface of claim 14, wherein the generated response to the resource request message includes information about at least one of a depth of the queue and a size of the queue.

17. The method of claim 12, wherein one or more memory regions of the plurality of memory regions are registered memory regions.

18. The method of claim 17, wherein one or more memory region access keys are stored on the network interface, each memory region access key corresponding to one of the plurality of registered memory regions.

19. The method of claim 17, wherein the one or more registered memory regions each correspond to an application executing on the host computer coupled to the network interface.

20. The method of claim 12 further comprising:
   updating the host memory region counters in response to determining that the source of the resource request message is authorized to seek system utilization data associated with the memory region identified in the resource request message.

21. The method of claim 20, wherein the source of the resource request message is a third-party entity that is separate and independent of the network interface and the host computer connected to the network interface.

22. The method of claim 20, wherein the resource request message includes host memory access request information, and the method further comprises:
   determining the authority of the source of the resource request using the host memory access request information and the memory region access key corresponding to the identified registered memory region stored on the network interface.

23. A non-transitory computer-readable medium on which instructions are stored, the instructions, when executed by one or more computing devices perform a method that comprises:
   maintaining, on a network interface that can access a plurality of memory regions on a host computer coupled to the network interface, a plurality of host memory region counters, wherein each of the plurality of host memory region counters
   i) corresponds to one of the plurality of memory regions located in a physical memory of the host computer coupled to the network interface, and
   ii) includes a system utilization metric associated with its corresponding memory region;
   updating the host memory region counters in response to receipt by the network interface of requests to access the respective host memory regions;
   receiving a resource request message, at the network interface, seeking system utilization data associated with a memory region identified in the resource request message;
   determining, using a cryptographic process on the received resource request message, whether the source of the resource request message is authorized to seek system utilization data associated with the memory region identified in the resource request message, the cryptographic process comprising decrypting a portion of the received resource request message to generate authentication data and comparing the authentication data to an authentication tag included in the received resource request message; and
   generating a response to the received resource request message based on information stored in the host memory region counter associated with the memory region identified in the resource request message when the source of the resource request message is authorized.

24. The non-transitory computer-readable medium of claim 23, wherein the network interface further comprises a global counter that includes a system utilization metric associated with the network interface and the method further comprises:
updating the global counter in response to receipt by the network interface of requests to access the respective host memory regions; and
updating the global counter in response to receiving the resource request message.

25. The non-transitory computer-readable medium of claim 23, wherein one or more memory regions of the plurality of memory regions are associated with a queue.

26. The non-transitory computer-readable medium of claim 23, wherein the generated response to the resource request message includes information about a head and a tail of the memory region identified in the resource request message.

27. The network interface of claim 25, wherein the generated response to the resource request message includes information about at least one of a depth of the queue and a size of the queue.

28. The non-transitory computer-readable medium of claim 23, wherein one or more memory regions of the plurality of memory regions are registered memory regions.

29. The non-transitory computer-readable medium of claim 28, wherein one or more memory region access keys are stored on the network interface, each memory region access key corresponding to one of the plurality of registered memory regions.

30. The non-transitory computer-readable medium of claim 28, wherein the one or more registered memory regions each correspond to an application executing on the host computer coupled to the network interface.

31. The non-transitory computer-readable medium of claim 23, wherein the method further comprises:
updating the host memory region counters in response to determining that the source of the resource request message is authorized to seek system utilization data associated with the memory region identified in the resource request message.

32. The non-transitory computer-readable medium of claim 31, wherein the source of the resource request message is a third-party entity that is separate and independent of the network interface and the host computer connected to the network interface.

33. The non-transitory computer-readable medium of claim 31, wherein the resource request message includes host memory access request information, and the method further comprises:
determining the authority of the source of the resource request using the host memory access request information and the memory region access key corresponding to the identified registered memory region stored on the network interface.

* * * * *